United States Patent
Rajadurai et al.

(10) Patent No.: US 10,708,768 B2
(45) Date of Patent: Jul. 7, 2020

(54) AUTOMATIC SELF-ACTIVATION OF UNIVERSAL INTEGRATED CIRCUIT CARD

(71) Applicant: Samsung Electronics Co., Ltd., Suwon-si, Gyeonggi-do (KR)

(72) Inventors: Rajavelsamy Rajadurai, Bangalore (IN); Duckey Lee, Seoul (KR); Suresh Chitturi, Post Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/464,971

(22) PCT Filed: Dec. 1, 2017

(86) PCT No.: PCT/KR2017/014029
§ 371 (c)(1),
(2) Date: May 29, 2019

(87) PCT Pub. No.: WO2018/101797
PCT Pub. Date: Jun. 7, 2018

(65) Prior Publication Data
US 2019/0327610 A1    Oct. 24, 2019

(30) Foreign Application Priority Data

Dec. 1, 2016    (IN) .............................. 201641041168
Nov. 30, 2017   (IN) .............................. 201641041168

(51) Int. Cl.
H04W 8/20    (2009.01)
H04W 8/26    (2009.01)

(52) U.S. Cl.
CPC .................................. *H04W 8/265* (2013.01)

(58) Field of Classification Search
CPC ....................................................... H04W 8/26
See application file for complete search history.

(56) References Cited

U.S. PATENT DOCUMENTS

2013/0304646 A1*   11/2013   de Geer ................. G06Q 20/16
                                                         705/44
2014/0101034 A1    4/2014   Tannner et al.
2014/0162723 A1    6/2014   Kumar et al.
(Continued)

FOREIGN PATENT DOCUMENTS

WO    2016-153303 A1    9/2016

*Primary Examiner* — Michael T Vu
(74) *Attorney, Agent, or Firm* — Jefferson IP Law, LLP (57) ABSTRACT

Accordingly, embodiments herein provide a method for self-activation of universal integrated circuit card (UICC) in a mobile device. The method includes receiving, by a UICC-activation application installed at the mobile device an input data from a user of the mobile device, wherein the UICC-activation application is associated with an operator of the UICC. The method also includes determining, by the UICC-activation application at the mobile device, whether an electronic-Know Your Customer (e-KYC) procedure needs to be initiated for obtaining a subscription to the UICC in the mobile device based on the input data. Furthermore, the method includes initiating, by the UICC-activation application at the mobile device, the e-KYC procedure with at least one operator server based on the input data and automatically activating the subscription in the UICC of the mobile device based on the e-KYC procedure.

20 Claims, 6 Drawing Sheets

(56) References Cited

U.S. PATENT DOCUMENTS

| | | |
|---|---|---|
| 2016/0007190 A1 | 1/2016 | Wane |
| 2016/0105540 A1 | 4/2016 | Kwon et al. |
| 2016/0174066 A1* | 6/2016 | Aboulhosn ........... H04W 8/205 455/418 |
| 2018/0103370 A1 | 4/2018 | Park et al. |

* cited by examiner

AUTOMATIC SELF-ACTIVATION OF UNIVERSAL INTEGRATED CIRCUIT CARD

CROSS-REFERENCE TO RELATED APPLICATION(S)

This application is a U.S. National Stage application under 35 U.S.C. § 371 of an International application number PCT/KR2017/014029, filed on Dec. 1, 2017, which is based on and claimed priority of an Indian Provisional patent application number 201641041168, filed on Dec. 1, 2016, and an Indian complete patent application number 201641041168, filed on Nov. 30, 2017, in the Indian Intellectual Property Office, the disclosure of each of which is incorporated by reference herein in its entirety.

BACKGROUND

1. Field

The embodiments herein relate in general to wireless communication, and more particularly relate to a method and system for self-activation of an embedded universal integrated circuit card (UICC). The present application is based on, and claims priority from an Indian Application Number.201641041168 filed on 1 Dec. 2016, the disclosure of which is hereby incorporated by reference herein.

2. Description of Related Art

A Universal Integrated Circuit Card (UICC) is a smart card inserted and used in a mobile device. The UICC stores unique and personal information of a mobile communication subscriber, such as authentication information for network access, phonebook data, and text messages. When the mobile device connects to a mobile communication network such as a Long Term Evolution (LTE) network, the UICC performs subscriber authentication and traffic security key generation to thereby enable secure mobile communication. The UICC may store communication applications including a Subscriber Identity Module (SIM), Universal Subscriber Identity Module (USIM), and IP Multimedia Services Identity Module (ISIM) according to the type of mobile communication network to which the subscriber connects. In addition, the UICC provides a high level security function to install a variety of applications such as electronic wallets, tickets and passports.

A typical UICC is manufactured as a proprietary smart card of a specific mobile network operator according to requests of the mobile network operator. At the time of shipment, such a UICC is pre-provisioned with authentication information for network access to the corresponding mobile operator network. Hence, the mobile network operator receives a manufactured UICC and provides the received UICC to a subscriber, and later, if necessary, performs management of the UICC by installing, modifying and removing an application through Over-The-Air (OTA) programming or the like.

The European Telecommunications Standards Institute (ETSI) has defined physical configurations and logical functions of UICCs to maintain worldwide compatibility. The form factor specifying physical configurations has continuously decreased: mini-SIMs were followed by micro-SIMs, and nano-SIMs. The development of smaller SIM cards has contributed to the development of smaller and slim devices. However, it is expected that it will be difficult to standardize UICC cards smaller than recently specified nano-SIMs because of user handling the SIM cards, for example, the high likelihood of losing a card. Removable UICC cards may be unsuitable for machine-to-machine (M2M) devices, such as sensor devices, smart home appliances, electricity meters, water meters and Closed Circuit Television (CCTV) cameras, which require access to mobile data networks in various deployment environments without direct human intervention.

To address the above-mentioned problems, it is specified in ETSI to embed a secure element that has UICC or similar functions in a mobile device at the time of manufacture, in place of a removable UICC. However, such an embedded secure element would be irremovable after being installed in a mobile device. Hence, the mobile device may be unable to pre-store authentication information for access to a mobile operator network at the time of manufacture unless the mobile device is manufactured as a proprietary device of a particular mobile network operator. It would only be possible to configure such authentication information in a mobile device after a user who has purchased a mobile device subscribes to a mobile network operator.

In addition, unlike an existing UICC card that is manufactured and distributed as a proprietary card of a particular mobile network operator, a new embedded secure element would enable authentication information of various mobile network operators to be installed and managed in a secure and flexible manner when a user who has purchased a corresponding mobile device subscribes to a mobile network operator, unsubscribes from a mobile network operator, or changes mobile network operators. According to various usage scenarios such as a purchase of a new device, the new embedded secure element would also enable configured authentication information and stored user data to be securely transferred to a new mobile device.

Even though secure provisioning of mobile network access credentials is possible as specified in Global System for Mobile communications Association remote subscriber identity module provisioning (GSMA-RSP) specifications, verification of the customer identity before issuing and activation of the mobile subscription is a regulatory requirement in many countries, specifically in India. Mobile network services in India require domestic subscribers to prove their identity and address and provide these documents to the Mobile Network Operators (MNOs) or MNOs authorized agency/agent before availing the service. This customer (subscriber) identification process is known as "Know Your Customer" (KYC) and is prevalent among Indian Telecom service sectors. Indian Regulator requirements for the Operator/Licensee include maintaining authentic records of the subscribers (i.e. Know Your Customer (KYC)) for lawful interception and national security audits. Currently, a weeks' time is taken by the operator for verification of the identity, address, generation of KYC and activation of the subscription. Further, the customer is required to visit the store in person for application submission and the operator do verification of the identity and the address physically (by visiting the applicants address). Also, the regulatory requirement requires sales/franchise agent identity verification, to note the person who issued the subscription. Operator needs to store the Customer Application Form (CAF) with the verification details before activation of the subscription.

Based on the above constraints and stringent requirements in the UICC provisioning and regulatory requirements, full self-service mobile subscription activation is currently not possible, unless the customer visits the operator's store and submits required identity information. Thus, there remains a need for mechanisms through which full self-service mobile subscription activation can be done.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method and system for self-activation of a universal integrated circuit card of a mobile device.

Another object of the invention herein is to initiate an electronic-Know Your Customer procedure based authentication of user credentials transmitted from the mobile device for obtaining a subscription.

The principal object of the embodiments herein is to provide a method and system for self-activation of an embedded universal integrated circuit card (UICC) with the electronic KYC (e-KYC) information.

Another object of the embodiments herein is to provide a method and system for verification, validation and linking of the user's identity and details electronically during remote provisioning of the mobile network subscription to a mobile device.

Another object of the embodiments herein is to provide a method and system for obtaining the verification and validation of the user's identity electronically before or during or after the remote provisioning of subscriber credentials procedure for self-activation of the subscription by the user with the mobile device.

Accordingly, embodiments herein provide a method for self-activation of universal integrated circuit card (UICC) in a mobile device. The method includes receiving, by a UICC-activation application installed at the mobile device an input data from a user of the mobile device, wherein the UICC-activation application is associated with an operator of the UICC. An operator of the UICC is an entity which provides the necessary services to enable provisioning of the mobile network access subscription profiles to the embedded UICC. The method also includes determining, by the UICC-activation application at the mobile device, whether an electronic-Know Your Customer (e-KYC) procedure needs to be initiated for obtaining and activation of a subscription to the UICC in the mobile device based on the input data. Furthermore, the method includes initiating, by the UICC-activation application at the mobile device, the e-KYC procedure with at least one operator server based on the input data and automatically activating the UICC subscription in the mobile device based on the e-KYC procedure.

In an embodiment, the UICC-activation application enables the subscription to the UICC in the mobile device. In another embodiment, the input data comprises at least one of user biometric data, user Aadhaar number and a subscription plan selected by the user. In another embodiment, the at least one operator server is one of a mobile network operator server, an original equipment manufacturer (OEM) server and a third party server, which is point of sale server reachable via internet, authorised to provide mobile network access subscription to the mobile device users.

In an embodiment, the e-KYC procedure includes transmitting, by the UICC-activation application at the mobile device, the input data to the at least one operator server, receiving and displaying, by the mobile device, a Customer Application Form (CAF) comprising user credentials from the at least one operator server, verifying, by the mobile device, the user credentials of the CAF by the user of the mobile device, requesting a digital signature for the verified CAF, by the mobile device, using biometric information of the user, transmitting, by the mobile device, the verified CAF to the at least one operator server, downloading, by the mobile device, a UICC profile from the at least one operators and automatically activating the subscription in the UICC of the mobile device based on the UICC profile.

Accordingly, embodiments herein provide a method for self-activation of a universal integrated circuit card (UICC) of a mobile device. The method includes receiving, by at least one operator server, a request to initiate an e-KYC procedure from a UICC-activation application at the mobile device to activate a subscription in the UICC of the mobile device, wherein the UICC-activation application is associated with an operator of the UICC, initiating, by the at least one operator server, the e-KYC procedure with at least one operator server and transmitting, by the at least one operator, a UICC profile to the mobile device to activate the subscription in the UICC in the mobile device based on the e-KYC procedure.

In an embodiment, the e-KYC procedure includes receiving, by the at least one operator server, an input data from the UICC-activation application installed at the mobile device, verifying, by the at least one operator server, the input data using an Unique Identification Authority of India (UIDAI) server, receiving, by the at least one operator server user credentials from the UIDAI server based on verification of the input data, generating, by the at least one operator server, a Customer Application Form (CAF) comprising the user credentials received from the UIDAI server, sending, by the at least one operator server, the CAF to the mobile device to verify the user credentials received from the UIDAI server, receiving, by the at least one operator server, a consent from the user on the CAF and preparing and activating, by the at least one operator server, a UICC profile for the UICC at the mobile device.

Accordingly, embodiments herein provide a method for self-activation of a universal integrated circuit card (UICC) in a mobile device. The method includes receiving, by a UICC-activation application installed at the mobile device an input data from a user of the mobile device, wherein the UICC-activation application is associated with an operator of the UICC, determining, by the UICC-activation application at the mobile device, whether an electronic-Know Your Customer (e-KYC) procedure needs to be initiated for obtaining and activating a subscription to the UICC in the mobile device based on the input data, transmitting, by the UICC-activation application at the mobile device, input data to at least one operator server, receiving and displaying, by the mobile device, a Customer Application Form (CAF) comprising user credentials from at least one operator server, verifying, by the mobile device, the user credentials of the CAF by the user of the mobile device, requesting a digital signature for the verified CAF, by the mobile device, using biometric information of the user, transmitting, by the mobile device, the verified CAF to the at least one operator server, downloading, by the mobile device, a UICC profile from the at least one operators and automatically activating the subscription in the UICC of the mobile device based on the UICC profile.

Accordingly, embodiments herein provide method for self-activation of a universal integrated circuit card (UICC) of a mobile device. The method includes receiving, by at least one operator server, a request to initiate an e-KYC procedure from a UICC-activation application at the mobile device to activate a subscription in the UICC in the mobile device, wherein the UICC-activation application is associated with an operator of the UICC, initiating, by the at least one operator server, the e-KYC procedure with at least one operator server, receiving, by the at least one operator server, an input data from the UICC-activation application installed at the mobile device, verifying, by the at least one operator server, the input data using an UIDAI server, receiving, by the at least one operator server, user credentials from the UIDAI server based on verification of the input data, generating, by the at least one operator server, a customer Application Form (CAF) comprising the user credentials received from the UIDAI server, sending, by the at least one operator server, the CAF to the mobile device to verify the user credentials received from the UIDAI server, receiving, by the at least one operator server, a consent from the user on the CAF and preparing and activating, by the at least one operator server, a UICC profile for the subscription in the UICC at the mobile device.

Accordingly, embodiments herein provide a mobile device for self-activation of a universal integrated circuit card (UICC). The mobile device includes a memory storing a UICC-activation application, wherein the UICC-activation application is associated with an operator of the UICC, a processor and a UICC controller communicably coupled to the memory and the processor. The UICC controller is configured to execute the UICC-activation application to perform the steps of receiving an input data from a user of the mobile device, determining whether an e-KYC procedure needs to be initiated for obtaining and activating a mobile subscription to the UICC in the mobile device based on the input data, initiating the e-KYC procedure with at least one operator server based on the input data and automatically activating the subscription in the UICC in the mobile device based on the e-KYC procedure.

Accordingly, embodiments herein provide an operating server for self-activation of a universal integrated circuit card (UICC). The operator server includes a memory, a processor and a provisioning controller communicably coupled to the memory and the processor. The provisioning controller is configured to receive a request to initiate an e-KYC procedure from a UICC-activation application at the mobile device to activate a subscription in the UICC of the mobile device, wherein the UICC-activation application is associated with an operator of the UICC, initiate the e-KYC procedure with at least one operator server and transmit a UICC profile to the mobile device to activate the subscription in the UICC of the mobile device based on the e-KYC procedure.

Accordingly, embodiments herein provide a mobile device for self-activation of a universal integrated circuit card (UICC). The mobile device includes a memory storing a UICC-activation application, wherein the UICC-activation application is associated with an operator of the UICC, a processor and a UICC controller communicably coupled to the memory and the processor. The UICC controller is configured to execute the UICC-activation application to perform the steps of receiving an input data from a user of the mobile device, determining whether an e-KYC procedure needs to be initiated for obtaining and activating a subscription plan to the UICC in the mobile device based on the input data, initiating the e-KYC procedure with at least one operator server based on the input data, transmitting the input data to at least one operator server, receiving and causing to display a Customer Application Form (CAF) comprising user credentials from at least one operator server, verifying the user credentials of the CAF by the user of the mobile device, requesting a digital signature for the verified CAF, by the mobile device, using biometric information of the user; transmitting, by the mobile device, the verified CAF to the at least one operator server, digitally signing the verified CAF using biometric information of the user, transmitting the digitally signed CAF to the at least one network operator server, downloading a UICC profile from the at least one operators and automatically activating the subscription in the UICC of the mobile device based on the UICC profile.

Accordingly, embodiments herein provide an operating server for self-activation of a universal integrated circuit card (UICC). The operator server includes a memory, a processor and a provisioning controller communicably coupled to the memory and the processor. The provisioning controller is configured to receive an input data from the UICC-activation application installed at the mobile device, verify the input data using an UIDAI server, receive user credentials from the UIDAI server based on verification of the input data, generate a customer Application Form (CAF) comprising the user credentials received from the UIDAI server, send the CAF to the mobile device to verify the user credentials received from the UIDAI server, receive a consent from the user on the CAF and prepare and activate a UICC profile for the UICC at the mobile device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Accordingly, the examples should not be construed as limiting the scope of the embodiments herein. Further it should be possible to combine the flows specified in different figures to derive a new flow. Also it should be possible to combine the functionality of the different entities in this document, like the e-KYC User Agency (KUA) functionality can be co-located and performed by an entity. The following definitions are provided are better understanding of the embodiments described herein.

Know Your Customer (KYC): Customer (subscriber) identification process.

KYC User Agency (KUA): A valid Authentication User Agency who has been approved and has signed the agreement to access KYC API.

KYC Service Agency (KSA): A valid Authentication Service Agency who has been approved and has signed the agreement to access KYC API through their network.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Conventional methods of activating an embedded universal integrated circuit card (UICC), in view of constraints and stringent requirements in UICC provisioning and regulatory requirements, do not include full self-service mobile subscription activation, unless a user visits the operator's store and submits required identity information.

Unlike the conventional methods, the embodiments herein provide a method and system for self-activation of an embedded UICC. The method allows full online self-activation of mobile service for enabling a user to establish a new subscription and activate the subscription online, without physically visiting any mobile operator's shop/store or Operator authorized agent's shop/store for verification and validation of the user's identity (which includes address and photo). Verification and validation of the user's identity should be possible by using a self-activation app and servers.

Referring now to the drawings, and more particularly to FIGS. 1 through 6B, where similar reference characters denote corresponding features consistently throughout the figures, there are shown preferred embodiments.

Figure 1:
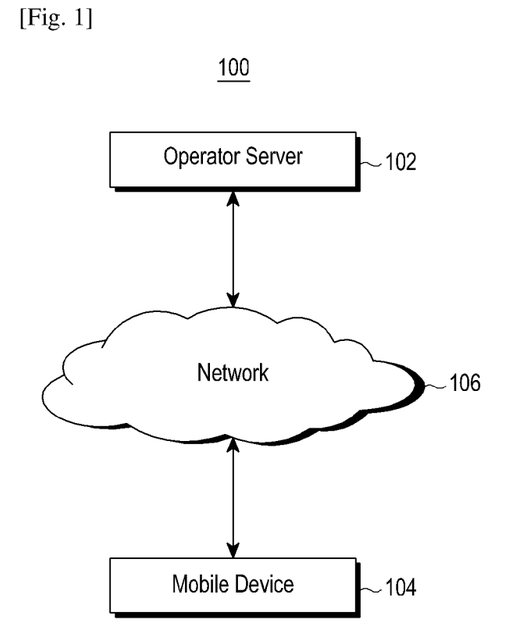
FIG. 1 illustrates a network environment with an operator server and a mobile device connected through a communication network, according to an embodiment disclosed herein.

FIG. 1 illustrates a network environment 100 in which an operator server 102 is connected to a mobile device 104 through a communication network 106.

The communication network 106 can include a data network such as, but not restricted to, the Internet, local area network (LAN), wide area network (WAN), metropolitan area network (MAN) etc. In certain embodiments, the communication network 106 can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), Long Term Evolution (LTE) etc. In some embodiments, the communication network 106 may include or otherwise cover networks or sub-networks, each of which may include, for example, a wired or wireless data pathway. The communication network 106 may include a circuit-switched voice network, a packet-switched data network, or any other network capable for carrying electronic communications. For example, the network may include networks based on the Internet protocol (IP) or asynchronous transfer mode (ATM), and may support voice usage, for example, VoIP, Voice-over-ATM, or other comparable protocols used for voice data communications. In one implementation, the network includes a cellular telephone network configured to enable exchange of text or SMS messages.

Examples of the communication network 106 may further include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth. Embodiments are intended to include or otherwise cover any type of network, including known, related art, and/or later developed technologies to connect the server 102 and the node 104 with each other.

The mobile device 104 can include any electronic device, such as desktop computers, portable computers, smart phones, tablet computers, wearable devices, and the like. The mobile device 104 can also include a display unit (not shown) for displaying any data. The display unit can include, but not limited to, a Cathode Ray Tube (CRT) display, a Liquid Crystal Display (LCD), a Light Emitting Diode (LED) display, and the like. Embodiments are intended to include or otherwise cover any type of display, including known, related art, and/or later developed technologies.

The operator server 102 includes a non-transitory computer medium that can be configured to receive and transmit communication requests and/or communication responses to and from the mobile device 104. The operator server 102 can be any or a combination of a server, a local computer connected to the communication network 106 or an edge device connected to the communication network 106. The operator server 102 is managed by a cellular service operator that provides cellular or mobile telephony services to the mobile device 102.

Figure 2:
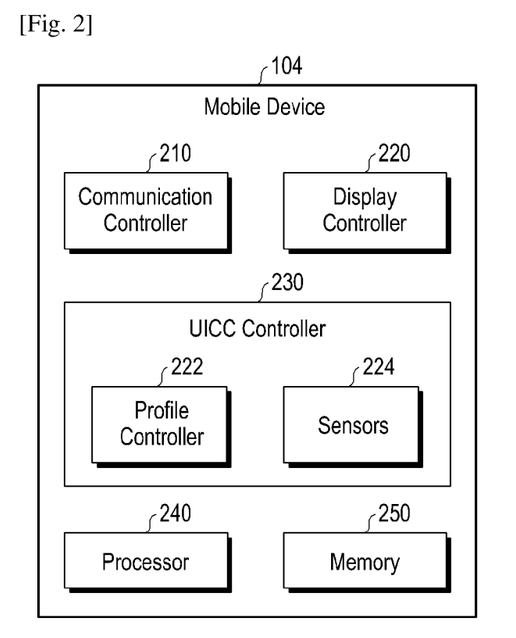
FIG. 2 illustrates hardware components of the mobile device, according to an embodiment disclosed herein.

FIG. 2 is a block diagram illustrating hardware components of the mobile device, according to an embodiment disclosed herein. The mobile device includes a communication controller 210, a display controller 220, a UICC controller 230, a processor 240 and a memory 250.

The processor 240 can be, but not restricted to, a Central Processing Unit (CPU), a microprocessor, or a microcontroller. The processor 240 is coupled to the memory 250, the UICC controller 230, the display controller 220 and the communication controller 210. The processor 240 executes sets of instructions stored on the memory 250. The memory 250 includes storage locations to be addressable through the processor 240. The memory 250 is not limited to a volatile memory and/or a non-volatile memory. Further, the memory 250 can include one or more computer-readable storage media. The memory 250 can include non-volatile storage elements. For example non-volatile storage elements can include magnetic hard discs, optical discs, floppy discs, flash memories, or forms of electrically programmable memories (EPROM) or electrically erasable and programmable (EEPROM) memories. In some examples the memory 250 can be configured to store larger amount of applications stored therein to provide one or more services to the user. In some embodiments, the memory 250 stores a UICC-activation application that provides sets of instructions executed by the communication controller 210, the display controller 220, the UICC controller 230 and the processor 240.

The communication controller 210 is a set of integrated circuits used to receive and transmits data signals via the communication network 106. Through the communication controller, the mobile device 104 is connected to the communication network 106. The display controller 220 is a set of integrated circuits and semiconductor chips that causes to display information on a display screen connected to the mobile device 104. In some embodiments, the mobile device includes a display screen coupled to the display controller 220.

The UICC controller 230 further includes a profile controller 222 and sensors 224. The profile controller 222 receives input information including at least one of user biometric data, user identity information and a subscription plan selected by the user. The user identity information can further comprise a name, age, date of birth, address of the user. In some embodiments, the user identity information can be an identification number such as, but not limited to an Aadhaar number, a passport identification number, a residence permit number, a driving license identification number and the like. The sensors 224 include a biometric device such as, but not limited to a fingerprint scanner, an iris scanner, a face mapping scanner and the like.

Figure 3:
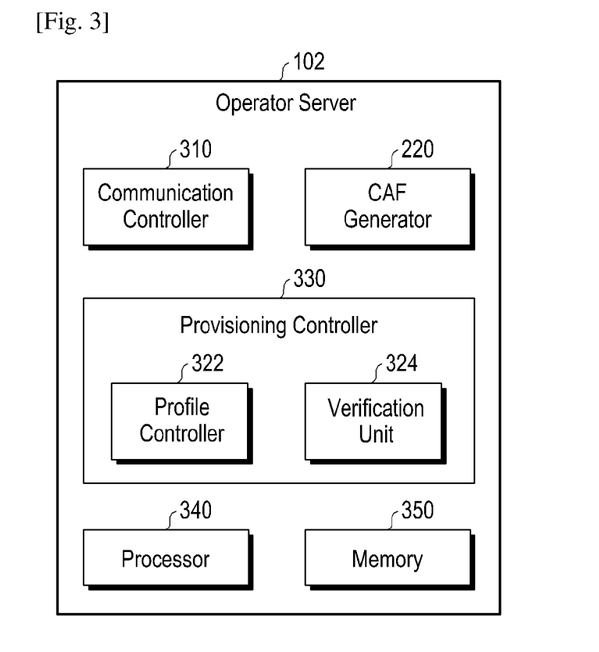
FIG. 3 illustrates hardware components of operator server, according to an embodiment disclosed herein.

FIG. 3 illustrates hardware components of the operator server 102, according to an embodiment disclosed herein. The operator server 102 includes a communication controller 310, a customer application form (CAF) generator 320, a provisioning controller 330, a processor 340 and a memory 350. The provisioning controller 330 further includes a profile controller 322 and a verification unit 324.

In some embodiments, the operator server 102 can be but not limited to a mobile network operator server, an original equipment manufacturer (OEM) server and a third party server. In some embodiments, the operator server 102 is provided by a mobile network service provider, while in other embodiments, the operator server is provided by an OEM. The OEM can be the manufacturer of the mobile device 104. In yet other embodiments, the operator server 102 is provided by a third party that can provide subscriptions to multiple cellular service providers.

The processor 340 can be, but not restricted to, a Central Processing Unit (CPU), a microprocessor, or a microcontroller. The processor 340 is coupled to the memory 350, the UICC controller 330, the display controller 320 and the communication controller 310. The processor 340 executes sets of instructions stored on the memory 350. The memory 350 includes storage locations to be addressable through the processor 340. The memory 350 is not limited to a volatile memory and/or a non-volatile memory. Further, the memory 350 can include one or more computer-readable storage media. The memory 350 can include non-volatile storage elements. For example non-volatile storage elements can include magnetic hard discs, optical discs, floppy discs, flash memories, or forms of electrically programmable memories (EPROM) or electrically erasable and programmable (EEPROM) memories. In some examples the memory 350 can be configured to store larger amount of applications stored therein to provide one or more services to the user. In some embodiments, the memory 350 stores a UICC-activation application that provides sets of instructions executed by the communication controller 310, the display controller 320, the UICC controller 330 and the processor 340.

The communication controller 310 is a set of integrated circuits used to receive and transmits data signals via the communication network 106. The communication controller 310 receives the input information transmitted by the communication controller 210 via the communication network 106. The CAF generator 320 receives input information from the communication controller 310 and generates a customer application form (CAF) using the user identity information of the input data received.

The provisioning controller 330 further includes a profile controller 322 and a verification unit 324. The profile controller 322 receives input information including at least one of user biometric data, user identity information and a subscription plan selected by the user. The user identity information can further comprise a name, age, date of birth, address of the user. In some embodiments, the user identity information can be an identification number such as, but not limited to an Aadhaar number, a passport identification number, a residence permit number, a driving license identification number and the like. The verification unit 324 is a set of chips that decrypt and encrypt information in accordance with known encryption techniques. The verification unit 324 further enables a video communication between the communication controller 310 and the communication controller 210 (shown in FIG. 2) for verifying the identity of the user.

Figure 4:
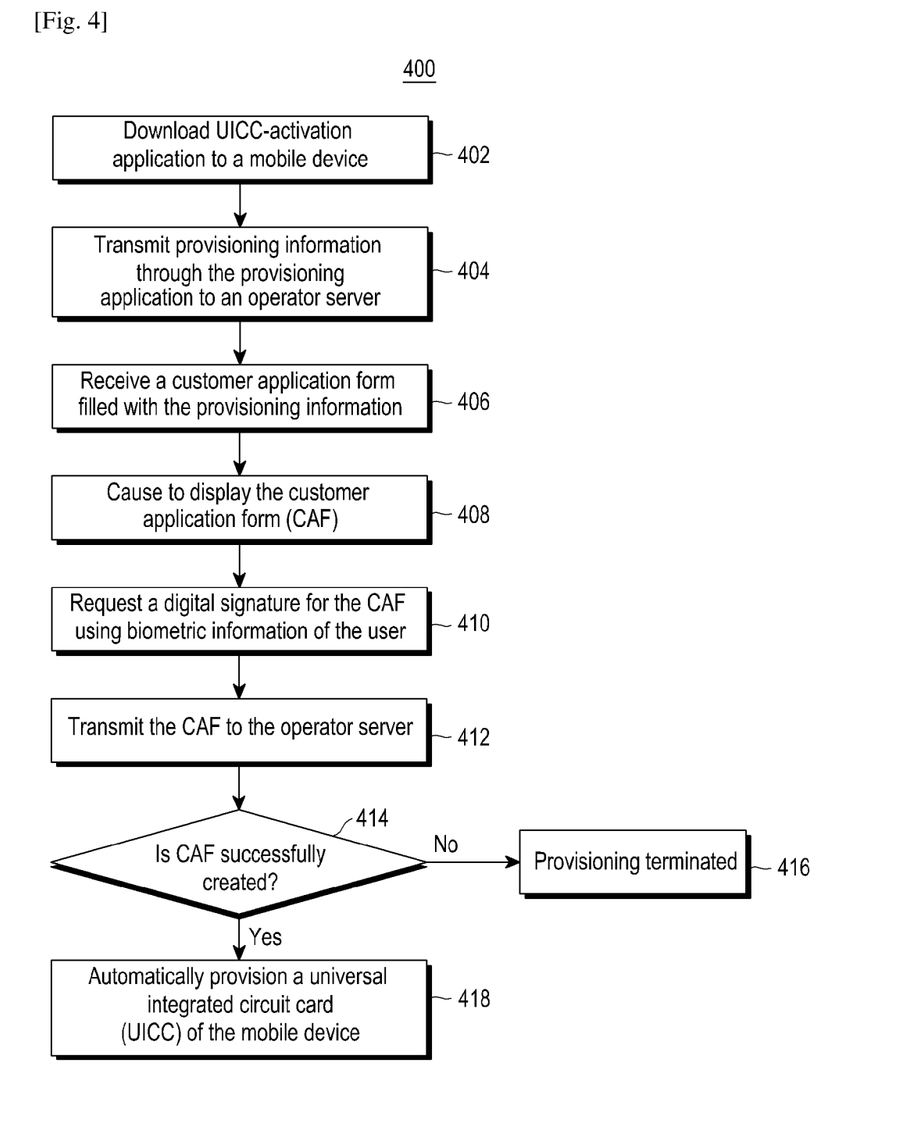
FIG. 4 is a flow diagram illustrating a method for self-activation of a universal integrated circuit card (UICC) in the mobile device, according to an embodiment disclosed herein.

FIG. 4 is a flow diagram illustrating a method for self-activation of a universal integrated circuit card (UICC) in the mobile device, according to an embodiment disclosed herein. At step 402, a UICC-activation application is downloaded by the user and stored on the memory 250. The downloaded UICC-activation application provides a user interface through which the user provides the input information including the user identity information, the biometric information of the user and a subscription plan. The subscription plan is any service offered by the cellular service operator. The UICC-activation application enables the subscription to the UICC in the mobile device and provided by the operator server 102.

Biometric information is provided using the sensors 224. In some embodiments, the biometric information can be a fingerprint or an iris scan. Further, the input information is temporarily stored on the memory 250 for security processing. The user identity information is encrypted by the profile controller 222. The UICC controller 230 captures the Aadhaar number and the biometric of the user and forms an encrypted Personal Identity Data (PID) block. The PID block is transmitted to the operator server 104 using the communication controller. At step 404, the PID block and the information indicative of a subscription plan are transmitted to the operator server 102.

For enabling electronic KYC (or e-KYC) for Aadhaar holders, typically a three tier KYC architecture is used. The three-tier architecture includes a KYC User Agency (KUA) server, a KYC Service Agency (KSA) and a UIDAI (Unique Identification Authority of India) server. The KUA server forms an auth.xml file using the PID block, signs it, and uses that to form a kyc.xml file and signs it and sends to the KSA server. The KSA server forwards the kyc.xml file to the UIDAI server. The UIDAI server authenticates the user identity information and if successful responds with corresponding digitally signed and encrypted user identity information in extensible markup language (XML) format. Demographic data and photograph in response is encrypted with a public key. The UIDIA server sends the response back to the KUA server enabling paper-less electronic KYC.

The KUA server verifies the signature and decrypts the KYC details. Then the KUA server sends the KYC details to the operator server 102. The verification unit 324 verifies the user identity information against the UIDAI Server provided KYC details. After successful verification, the CAF generator 320 generates the Customer Application Form (CAF) and, at step 406, provides the KYC details with the CAF to the mobile device 104 using the communication controller 310. At step 408, the display controller 220 causes to display the CAF to the user and requests confirmation from the user. The user checks the details of the CAF and the contract and provides biometric information to request a digital signature from the UIDAI server at step 410. At step 412, the CAF and the biometric information as part of the request for the digital signature is transmitted to the operator server 102 and subsequently to the UIDAI server. At step 414, the operator server checks whether the CAF is generated successfully with the digital signature of the user. If the check is successful, at step 418, a subscription in the UICC of the mobile device 104 is automatically activated. The UICC is automatically provisioned with a corresponding UICC profile. Otherwise, the provisioning process is terminated as seen in step 416.

In some embodiments, the user credentials of the CAF is verified based on using a video recording function at the mobile device 104 after step 406. The operator server 102 initiates a video call with the mobile device 104 such that the identity of the user can be verified independently.

Figure 5:
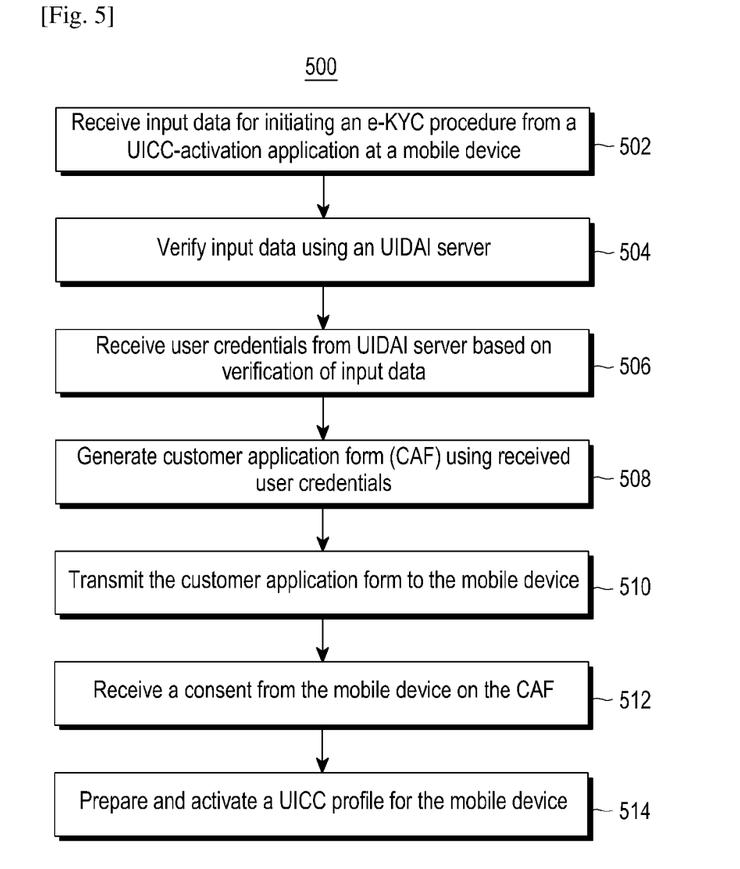
FIG. 5 is a flow diagram illustrating a method for remote provisioning of the UICC in the mobile device, according to an embodiment disclosed herein.

FIG. 5 is a flow diagram illustrating a method of remote provisioning the UICC of the mobile device 104 using the operator server 102. At step 502, the operator server 102 receives a request from the mobile device 104 to initiate the e-KYC procedure to activate the UICC in the mobile device. The communication controller 310 receives input information from the communication controller 210. In an embodiment, the operator server determines the need for eKYC and request the application in the mobile app to send the user identity information.

The operator server 102 forwards the protected user identity information to a UIDAI server. Based on the selected operator (by the user), the profile controller 322 identifies the operator's KUA (or Operator Preferred KUA) and forwards the protected user identity information to a UIDAI server via KUA and KSA. At step 504, the UIDAI server verifies the provided user identity information and retrieves the KYC details (Demographic data and photograph) of the user.

Then, at step 506 the UIDAI server 604 provides the KYC details to the operator server 102. The verification unit 324 verifies the user identity information against the UIDAI Server provided KYC details. In some embodiments, the identity information is verified based on using a video recording function at the mobile device 104. After successful verification, at step 508, the CAF generator 320 generates the Customer Application Form (CAF) and provides the KYC details with the CAF to the mobile device 104 using the communication controller 310. The display controller 220 causes to display the CAF to the user 601 and requests confirmation from the user. At step 512, the user checks the details of the CAF and the contract and provides a consent to processing the CAF. The consent includes the verified CAF and a request for a digital signature. The request for the digital signature is made using biometric information such as a fingerprint scan and/or an iris scan provided by the user at the mobile device 104. At step 514, based on the CAF (with the digital signature), the operator server 102 transmit a UICC profile to the profile controller 222 so as to activate the UICC in the mobile device 104 based on the e-KYC procedure.

Figure 6A:
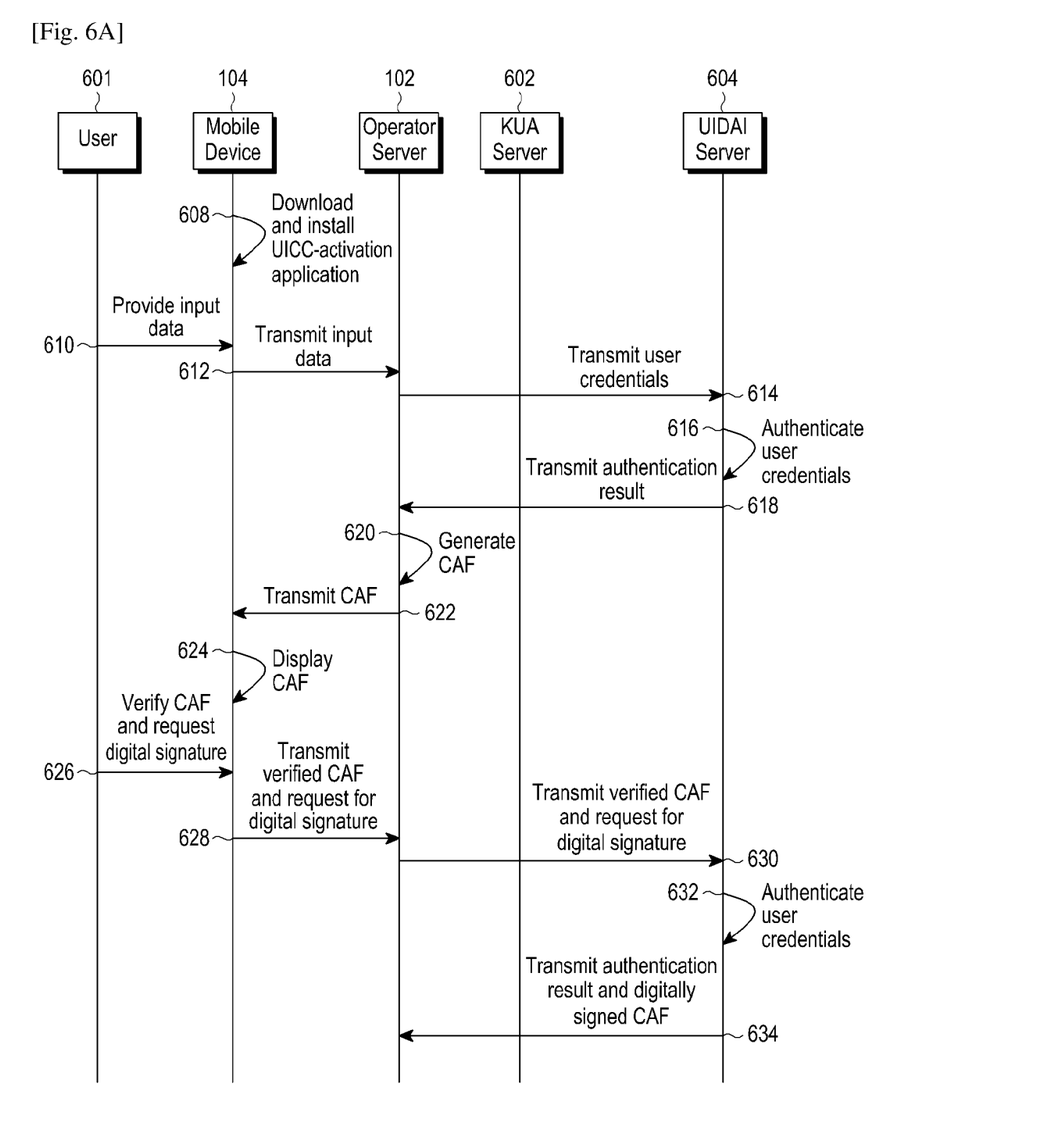
FIG. 6A is a sequence diagram illustrating the method for self-activation of a universal integrated circuit card (UICC) in the mobile device, according to an embodiment disclosed herein.
Figure 6B:
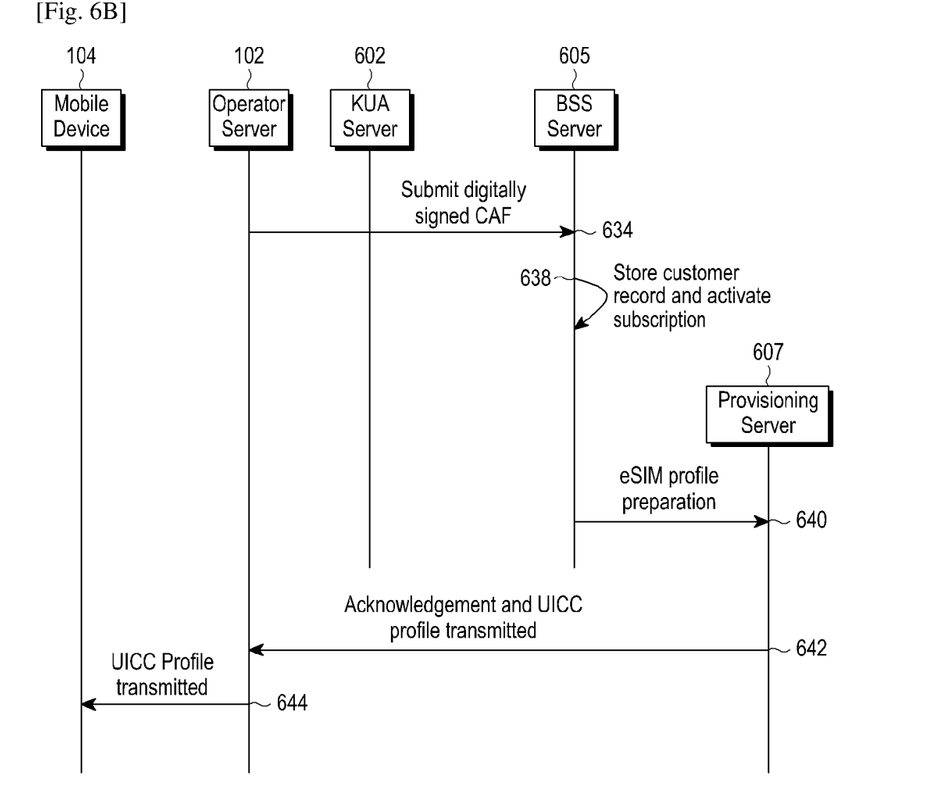
FIG. 6B is a continuation of the sequence diagram of FIG. 6A illustrating the method for self-activation of a universal integrated circuit card (UICC) in the mobile device, according to an embodiment disclosed herein.

FIG. 6A is a sequence diagram illustrating the method for self-activation of a universal integrated circuit card (UICC) in the mobile device, according to an embodiment disclosed herein. FIG. 6B is a continuation of the sequence diagram of FIG. 6A illustrating the method for self-activation of a universal integrated circuit card (UICC) in the mobile device.

The operator server 102 has trusted access to a KUA server 602 (shown in FIG. 6A) for eKYC authentication. The operator server 102 and a business support system (BSS) server 605 (shown in FIG. 6B) exchange necessary data at any time.

A user 601 purchases a device from an online (or offline) store. The user 601 unpacks and power-on the device. At step 608, the user downloads and installs the UICC-activation application. The UICC-activation application is stored in the memory 250. The UICC-activation application contacts the operator server 102 and displays the list of available operators and their plans (details fetched from the operator server 102). The operator server 102 supports users to, easily search and compares various operators' plans and subscribes to one of them online and also aid to easily download the corresponding provisioning profile to the UICC. The user 601 selects one of them and enters required information (i.e. billing, personal information like name, date of birth, address etc.) into the mobile device 104.

The eKYC procedures are performed over the mobile device 104, with the following amendments to the current eKYC process: The operator server 102 plays the role of the operator's agent and is authenticated (e.g. via a transport layer security) by a KUA server 602. Customer face verification is skipped, or performed online (performed by a human online or by a face recognition software). After e-KYC authentication and submission of the created Customer Authentication Form (CAF) to the user selected operator, the operator's USIM Profile is downloaded to the UICC in the mobile device 104. The mobile device 104 connects to the operator's mobile network and starts to use the service.

The interface between the mobile device 104 (with e-KYC authentication capability) and the operator server 102 (which also supports Remote Provisioning of network access credentials) is protected using the mechanism as specified in the Global System for Mobile communications Association remote subscriber identity module provisioning (GSMA-RSP) specifications. In some embodiments, a point of sale certificate may be issued by the KUA server 602. User identity information exchanged between the mobile device 104 and the UIDAI server 604 are protected using a public key governed by the UIDAI server 604 in the server certificate.

At step 610, the user 601 provides the input information and also selects the subscription plan displayed in the mobile device 104 (fetched from the operator server 102). The profile controller 222 protects the user identity information using the public key of the UIDAI server (server certificate) and may also protect the user's interest (selection of subscription plan) using transport layer security. Then, at step 612, the communication controller 210 forwards the protected user identity information and the user selection to the operator server 102. At step 614, the operator server 102 forwards the protected user identity information to the UIDAI server 604 via the KUA server 602. Based on the selected operator (by the user), the profile controller 322 identifies the operator's KUA (or Operator Preferred KUA). At step 616, the UIDAI server 604 verifies the provided user identity information and retrieves the KYC details (Demographic data and photograph) of the user 601.

Then, at step 618 the UIDAI server 604 provides the KYC details to the operator server 102 via KUA server 602. The verification unit 324 verifies the user identity information against the UIDAI Server provided KYC details. After successful verification, at step 620, the CAF generator 320 generates the Customer Application Form (CAF) and provides the KYC details with the CAF to the mobile device 104 using the communication controller 310. At step 624, the display controller 220 causes to display the CAF to the user 601 and requests confirmation from the user 601. The user 601 checks the details of the CAF and the contract and requests a digital signature for the verified CAF, by the mobile device, using biometric information of the user. Mobile device transmitting, the verified CAF to the at least one operator server with the protected biometric information. The biometric information can be but not limited to a fingerprint scan or an iris scan. The mobile device 104 forwards the digital signature to the operator server 102. The digital signature is applied by the UIDAI server 604 at steps 628, 630 and 632 for the CAF.

Upon successful verification of the digital signature, at step 634, the operator server 102 submits the CAF along with its certificate issued for its eKYC purpose to a BSS server 605 (shown in FIG. 6B) via the KUA server 602 and requests subscription activation for the user 601. Throughout this document, the eKYC of the operator server 102 can be part of the CAF. At step 638, the BSS server 605 stores the CAF as a customer record for legal and audit proposes.

After successfully storing the CAF, the BSS server 605 confirms the provisioning of the subscription credentials and details to the server. The BSS server 605 initiates and performs the remote provisioning to the UICC in the mobile device 104, as specified in the GSMA-RSP specifications. The BSS server 605 directs a provisioning server 607 to generate a UICC profile based on the information in the stored CAF. Accordingly, the UICC profile is downloaded to the mobile device 104.

In some embodiments, periodic eKYC verification can be performed based on a policy of the operator server 102. Manual triggering by a human agent or automatic triggering based on the period (e.g. once a month or once a quarter) configured in any or a combination of the operator server 102 and/or in the BSS server 605 and/or in the UICC controller 222 in the mobile device 104, can initiate the identity authentication against the user 601. The user 601 is directed through a text message or a notification caused to be displayed by the display controller 220 to enter his/her user identity information for e-KYC verification. The operator server 102 obtains the e-KYC report from the UIDAI server 604 and reports the KYC details and authentication result to the BSS server 605. The BSS server determines whether it will block or continue the service based on the authentication result.

The embodiments disclosed herein can be implemented through at least one software program running on at least one hardware device and performing network management functions to control the elements. The elements shown in FIG. 1 through 6B include blocks which can be at least one of a hardware device, or a combination of hardware device and software module.

In an embodiment, a method for self-activation of a universal integrated circuit card (UICC) in a mobile device comprises: receiving, by a UICC-activation application installed at the mobile device an input data from a user of the mobile device, wherein the UICC-activation application is associated with an operator of the UICC; determining, by the UICC-activation application at the mobile device, whether an electronic-Know Your Customer (e-KYC) procedure needs to be initiated for obtaining and activating a subscription to the UICC in the mobile device based on the input data; initiating, by the UICC-activation application at the mobile device, the e-KYC procedure with at least one operator server based on the input data; and automatically activating the subscription in the UICC of the mobile device based on the e-KYC procedure.

Herein, the UICC-activation application enables the subscription to the UICC in the mobile device.

Also, the input data comprises at least one of user biometric data, user Aadhaar number and a subscription plan selected by the user.

Also, the at least one operator server is one of a mobile network operator server, an original equipment manufacturer (OEM) server and a third party server.

Also, the e-KYC procedure comprises: transmitting, by the UICC-activation application at the mobile device, the input data to the at least one operator server; receiving and displaying, by the mobile device, a Customer Application Form (CAF) comprising user credentials from the at least one operator server; verifying, by the mobile device, the user credentials of the CAF by the user of the mobile device; requesting a digital signature for the verified CAF, by the mobile device, using biometric information of the user; transmitting, by the mobile device, the verified CAF to the at least one operator server; downloading, by the mobile device, a UICC profile from the at least one operators; and automatically activating the subscription in the UICC of the mobile device based on the UICC profile.

Also, the user credentials comprises user profiled information corresponding to the Aadhaar number verified by UIDAI server.

Also, the input data is protected using a UIDAI server certificate before transmitting to the at least one operator server.

Also, the user credentials of the CAF is verified based on using a video recording function at the mobile device.

In an embodiment, a method for self-activation of a universal integrated circuit card (UICC) of a mobile device comprises receiving, by at least one operator server, a request to initiate an e-KYC procedure from a UICC-activation application at the mobile device to activate a subscription in the UICC of the mobile device, wherein the UICC-activation application is associated with an operator party; initiating, by the at least one operator server, the e-KYC procedure with at least one e-KYC server; and transmitting, by the at least one operator, a UICC profile to the mobile device to activate the subscription in the UICC in the mobile device based on the e-KYC procedure.

Herein, the operator server is at least one of a mobile network operator server, an original equipment manufacturer (OEM) server and a third party server.

Also, the UICC-activation application enables the subscription to the UICC in the mobile device.

Also, the e-KYC procedure comprises: receiving, by the at least one operator server, an input data from the UICC-activation application installed at the mobile device; verifying, by the at least one operator server, the input data using an Unique Identification Authority of India (UIDAI) server; receiving, by the at least one operator server user credentials from the UIDAI server based on verification of the input data; generating, by the at least one operator server, a customer Application Form (CAF) comprising the user credentials received from the UIDAI server; sending, by the at least one operator server, the CAF to the mobile device to verify the user credentials received from the UIDAI server; receiving, by the at least one operator server, a consent from the user on the CAF; and preparing and activating, by the at least one operator server, a UICC profile for the UICC at the mobile device.

Also, the input data comprises at least one of user biometric data, user Aadhaar number and a subscription plan selected by the user.

Also, activating of the UICC profile comprises activation of the subscription plan selected by the user.

Also, the user credentials comprises user profiled information corresponding to the Aadhaar number verified by UIDAI server.

Also, the input data is protected using a UIDAI server certificate before transmitting to the at least one operator server.

Also, the consent comprises the verified CAF and a request for a digital signature from the mobile device.

In an embodiment, a method for self-activation of a universal integrated circuit card (UICC) in a mobile device comprises receiving, by a UICC-activation application installed at the mobile device an input data from a user of the mobile device, wherein the UICC-activation application is associated with an operator of the UICC; determining, by the UICC-activation application at the mobile device, whether an electronic-Know Your Customer (e-KYC) procedure needs to be initiated for obtaining and activating a subscription to the UICC in the mobile device based on the input data; transmitting, by the UICC-activation application at the mobile device, input data to at least one operator server; receiving and displaying, by the mobile device, a Customer Application Form (CAF) comprising user credentials from at least one operator server; verifying, by the mobile device, the user credentials of the CAF by the user of the mobile device; requesting a digital signature for the verified CAF, by the mobile device, using biometric information of the user; transmitting, by the mobile device, the verified CAF to the at least one operator server; downloading, by the mobile device, a UICC profile from the at least one operator; and automatically activating the subscription in the UICC of the mobile device based on the UICC profile.

Herein, the user credentials comprises user profiled information corresponding to the Aadhaar number verified by UIDAI server.

Also, the input data is protected using a UIDAI server certificate before transmitting to the at least one operator server.

Also, the user credentials of the CAF is verified based on using a video recording function at the mobile device.

Also, the operator server is at least one of a mobile network operator server, an original equipment manufacturer (OEM) server and a third party server.

In an embodiment, a method for self-activation of a universal integrated circuit card (UICC) of a mobile device comprises: receiving, by at least one operator server, a request to initiate an e-KYC procedure from a UICC-activation application at the mobile device to activate a subscription in the UICC in the mobile device, wherein the UICC-activation application is associated with an operator of the UICC; initiating, by the at least one operator server, the e-KYC procedure with at least one e-KYC server; receiving, by the at least one operator server, an input data from the UICC-activation application installed at the mobile device; verifying, by the at least one operator server, the input data using an UIDAI server; receiving, by the at least one operator server, user credentials from the UIDAI server based on verification of the input data; generating, by the at least one operator server, a customer Application Form (CAF) comprising the user credentials received from the UIDAI server; sending, by the at least one operator server, the CAF to the mobile device to verify the user credentials received from the UIDAI server; receiving, by the at least one operator server, a consent from the user on the CAF; and preparing and activating, by the at least one operator server, a UICC profile for the subscription in the UICC at the mobile device.

Herein, the user credentials comprises user profiled information corresponding to the Aadhaar number verified by UIDAI server.

Also, the input data is protected using a UIDAI server certificate before transmitting to the at least one operator server.

Also, the user credentials of the CAF is verified based on using a video recording function at the mobile device.

Also, the operator server is at least one of a mobile network operator server, an original equipment manufacturer (OEM) server and a third party server.

In an embodiment, a mobile device for self-activation of a universal integrated circuit card (UICC) comprises: a memory storing a UICC-activation application, wherein the UICC-activation application is associated with an operator of the UICC; a processor; a UICC controller communicably coupled to the memory and the processor, the UICC controller is configured to execute the UICC-activation application to perform the steps of: receiving an input data from a user of the mobile device; determining whether an e-KYC procedure needs to be initiated for obtaining and activating a subscription to the UICC in the mobile device based on the input data; initiating the e-KYC procedure with at least one operator server based on the input data; transmitting the input data to at least one operator server; receiving and causing to display a Customer Application Form (CAF) comprising user credentials from at least one operator server; verifying the user credentials of the CAF by the user of the mobile device; requesting a digital signature for the verified CAF, by the mobile device, using biometric information of the user; transmitting, by the mobile device, the verified CAF to the at least one operator server; downloading a UICC profile from the at least one operators; and automatically activating the subscription in the UICC based on the UICC profile.

Herein, the operator server is at least one of a mobile network operator server, an original equipment manufacturer (OEM) server and a third party server.

Also, the user credentials comprises user profiled information corresponding to the Aadhaar number verified by UIDAI server.

Also, the input data is protected using a UIDAI server certificate before transmitting to the at least one operator server.

Also, the user credentials of the CAF is verified based on using a video recording function at the mobile device.

In an embodiment, an operating server for self-activation of a universal integrated circuit card (UICC) of a mobile device comprises: a memory; a processor; a provisioning controller communicably coupled to the memory and the processor, the provisioning controller is configured to: receive an input data from the UICC-activation application installed at the mobile device; verify the input data using an UIDAI server; receive user credentials from the UIDAI server based on verification of the input data; generate a customer Application Form (CAF) comprising the user credentials received from the UIDAI server; send the CAF to the mobile device to verify the user credentials received from the UIDAI server; receive a consent from the user on the CAF; and prepare and activate a UICC profile for the UICC at the mobile device.

Herein, the operator server is at least one of a mobile network operator server, an original equipment manufacturer (OEM) server and a third party server.

Also, the user credentials comprises user profiled information corresponding to the Aadhaar number verified by UIDAI server.

Also, the input data is protected using a UIDAI server certificate before transmitting to the at least one operator server.

Also, wherein the user credentials of the CAF is verified based on using a video recording function at the mobile device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A mobile device for self-activation of a universal integrated circuit card (UICC), the mobile device comprising:
a memory storing a UICC-activation application, wherein the UICC-activation application is associated with an operator of the UICC;
a processor; and
a UICC controller communicably coupled to the memory and the processor, the UICC controller configured to:
execute the UICC-activation application,
receive input data from a user of the mobile device,
transmit, to at least one operator server, a request to initiate an electronic-know your customer (e-KYC) procedure to activate a subscription in the UICC of the mobile device, and
initiate the e-KYC procedure with the at least one operator server based on the input data,
wherein, to initiate the e-KYC procedure, the UICC controller is further configured to:
transmit, to the at least one operator server, the input data,
receive a customer application form (CAF) including user credentials from the at least one operator server,
request verification of the user credentials of the CAF from the user of the mobile device,
transmit the verified CAF to the at least one operator server,
receive a UICC profile from the at least one operator server, and
automatically activate the subscription in the UICC in the mobile device.

2. The mobile device of claim 1, wherein the operator server is at least one of a mobile network operator server, an original equipment manufacturer (OEM) server and a third party server.

3. The mobile device of claim 1, wherein the UICC-activation application enables the subscription to the UICC in the mobile device.

4. The mobile device of claim 1, wherein the input data comprises at least one of user biometric data, user Aadhaar number and a subscription plan selected by the user.

5. The mobile device of claim 1, wherein, to initiate the e-KYC procedure, the UICC controller is further configured to:
request a digital signature for the verified CAF using biometric information of the user.

6. The mobile device of claim 1, wherein the user credentials comprise user profiled information corresponding to an Aadhaar number verified by a unique identification authority of India (UIDAI) server.

7. The mobile device of claim 1, wherein the input data is protected using a unique identification authority of India (UIDAI) server certificate before transmitting to the at least one operator server.

8. The mobile device of claim 1, wherein the user credentials of the CAF is verified based on using a video recording function at the mobile device.

9. An operator server for self-activation of a universal integrated circuit card (UICC) of a mobile device, the operator server comprising:
a memory;
a processor; and a provisioning controller communicably coupled to the memory and the processor, the provisioning controller configured to:
  receive a request to initiate an electronic-know your customer (e-KYC) procedure from a UICC-activation application of the mobile device to activate a subscription in the UICC of the mobile device, wherein the UICC-activation application is associated with an operator of the UICC, and
  initiate the e-KYC procedure with the mobile device,
wherein, to initiate the e-KYC procedure, the provisioning controller is further configured to:
  receive input data from the UICC-activation application installed at the mobile device,
  generate a customer application form (CAF) comprising user credentials,
  transmit the CAF to the mobile device to verify the user credentials,
  receive a consent on the CAF from the mobile device,
  prepare and activate a UICC profile for the UICC at the mobile device, and
  transmit a UICC profile to the mobile device to activate the subscription in the UICC of the mobile device.

10. The operator server of claim 9, wherein the operator server is at least one of a mobile network operator server, an original equipment manufacturer (OEM) server and a third party server.

11. The operator server of claim 9, wherein the UICC-activation application enables the subscription provided by the operator server.

12. The operator server of claim 9, wherein, to initiate the e-KYC procedure, the provisioning controller is further configured to:
  verify the input data using a unique identification authority of India (UIDAI) server, and
  receive user credentials from the UIDAI server based on verification of the input data, wherein the user credentials comprise user profiled information corresponding to the UIDAI server.

13. The operator server of claim 12, wherein the input data comprises at least one of user biometric data, user Aadhaar number and a subscription plan selected by the user.

14. The operator server of claim 13, wherein the provisioning controller is further configured to:
  activate the subscription plan selected by the user.

15. A method by a mobile device for self-activating a universal integrated circuit card (UICC) of the mobile device, the method comprising:
  downloading a UICC-activation application, wherein the UICC-activation application is associated with an operator of the UICC;
  executing the UICC-activation application;
  receiving input data from a user of the mobile device;
  transmitting, to at least one operator server, a request to initiate an electronic-know your customer (e-KYC) procedure to activate a subscription in the UICC of the mobile device; and
  initiating, by the mobile device, the e-KYC procedure with at least one operator server based on the input data, wherein the initiating of the e-KYC procedure comprises:
  transmitting, to the at least one operator server, the input data;
  receiving a customer application form (CAF) including user credentials from the at least one operator server;
  requesting verification of the user credentials of the CAF from the user of the mobile device;
  transmitting the verified CAF to the at least one operator server;
  receiving a UICC profile from the at least one operator server; and
  automatically activating the subscription in the UICC in the mobile device.

16. The method of claim 15, wherein the input data comprises at least one of user biometric data, user Aadhaar number and a subscription plan selected by the user.

17. The method of claim 15, wherein the initiating of the e-KYC procedure further comprises:
  requesting a digital signature for a verified CAF, by the mobile device, using biometric information of the user after user's verifying the user credentials of the CAF.

18. A method for self-activating a universal integrated circuit card (UICC) of a mobile device by an operator server, the method comprising:
  receiving a request to initiate an electronic-know your customer (e-KYC) procedure from a UICC-activation application of the mobile device to activate a subscription in the UICC of the mobile device, wherein the UICC-activation application is associated with an operator of the UICC; and
  initiating the e-KYC procedure with the mobile device,
  wherein the initiating of the e-KYC procedure comprises:
    receiving input data from the UICC-activation application installed at the mobile device;
    generating a customer application form (CAF) comprising user credentials;
    transmitting the CAF to the mobile device to verify the user credentials;
    receiving a consent on the CAF from the mobile device;
    preparing and activating a UICC profile for the UICC at the mobile device; and
    transmitting a UICC profile to the mobile device to activate the subscription in the UICC of the mobile device based on the e-KYC procedure.

19. The method of claim 18, wherein the operator server is at least one of a mobile network operator server, an original equipment manufacturer (OEM) server and a third party server.

20. The method of claim 17, wherein the initiating of the e-KYC procedure with the mobile device further comprises:
  verifying the input data using a unique identification authority of India (UIDAI) server, and
  receiving user credentials from the UIDAI server based on verification of the input data, wherein the user credentials comprise user profiled information corresponding to the UIDAI server.

* * * * *